(12) United States Patent
Zhang et al.

(10) Patent No.: US 10,884,514 B2
(45) Date of Patent: Jan. 5, 2021

(54) MOUSE AND CONTROLLING METHOD THEREOF AND COMPUTER-READABLE STORAGE MEDIUM

(71) Applicant: BOE Technology Group Co., Ltd., Beijing (CN)

(72) Inventors: Yifei Zhang, Beijing (CN); Ying Zhang, Beijing (CN); Tailiang Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 16/225,097

(22) Filed: Dec. 19, 2018

(65) Prior Publication Data

US 2019/0332194 A1    Oct. 31, 2019

(30) Foreign Application Priority Data

Apr. 28, 2018 (CN) .......................... 2018 1 0399386

(51) Int. Cl.
| | |
|---|---|
| *G06F 3/033* | (2013.01) |
| *G06F 3/0354* | (2013.01) |
| *G05G 9/047* | (2006.01) |
| *G06F 3/02* | (2006.01) |
| *G06F 3/0362* | (2013.01) |

(52) U.S. Cl.
CPC ......... *G06F 3/03543* (2013.01); *G05G 9/047* (2013.01); *G06F 3/0219* (2013.01); *G06F 3/0362* (2013.01)

(58) Field of Classification Search
USPC .......... 345/161, 163, 164, 167, 173; 463/38; 386/248
See application file for complete search history.

(56) References Cited

U.S. PATENT DOCUMENTS 7,182,691 B1 *   2/2007   Schena ................... A63F 13/06
                                                                   463/38
2003/0214484 A1   11/2003   Haywood
(Continued)

FOREIGN PATENT DOCUMENTS

| CN | 103389809 A | 11/2013 |
| CN | 203706153 U | 7/2014 |
| CN | 204798827 U | 11/2015 |

OTHER PUBLICATIONS

First office action of Chinese application No. 201810399386.6 dated Oct. 27, 2020.

*Primary Examiner* — Thuy N Pardo
(74) *Attorney, Agent, or Firm* — Fay Sharpe LLP

(57) ABSTRACT

Provided are a mouse and a controlling method thereof, and a computer-readable storage medium, in the field of electronic device technology. The mouse includes an upper cover and two mouse halves, wherein a scroll wheel assembly is located between the two mouse halves, each of the mouse halves has a keypad and a joystick located inside the mouse, the joysticks on the two mouse halves are movably connected to the scroll wheel assembly respectively, the mouse further comprises at least one position adjusting part each connected to the scroll wheel assembly and one of the mouse halves; the at least one position adjusting part is configured for controlling the two mouse halves to move toward or away from each other.

18 Claims, 9 Drawing Sheets

(56) References Cited

U.S. PATENT DOCUMENTS

| | | | |
|---|---|---|---|
| 2005/0275637 A1* | 12/2005 | Hinckley | G06F 3/03549 345/173 |
| 2008/0080837 A1* | 4/2008 | Mei | G06F 3/04812 386/248 |
| 2008/0174553 A1* | 7/2008 | Trust | G06F 3/0202 345/163 |
| 2009/0295724 A1* | 12/2009 | Cheng | G05G 9/047 345/161 |
| 2010/0045600 A1* | 2/2010 | Pilkington | G06F 3/0383 345/161 |
| 2012/0068928 A1* | 3/2012 | Bruss | G06F 3/038 345/163 |
| 2012/0188160 A1* | 7/2012 | Wallace | G06F 3/0338 345/161 |
| 2013/0121148 A1 | 5/2013 | Chiang | |
| 2015/0103007 A1* | 4/2015 | Forshaug | G06F 3/0233 345/163 |
| 2015/0268741 A1* | 9/2015 | Evje | G06F 3/03543 345/163 |
| 2015/0355733 A1* | 12/2015 | Chang | G16H 50/20 345/163 |
| 2016/0239109 A1* | 8/2016 | Xia | G06F 3/03543 345/163 |
| 2017/0205900 A1* | 7/2017 | Su | F16H 25/2015 345/163 |
| 2017/0221064 A1* | 8/2017 | Turgeman | G06Q 20/4016 345/163 |
| 2018/0253156 A1* | 9/2018 | Tseng | G06F 3/0338 345/163 |

* cited by examiner

MOUSE AND CONTROLLING METHOD THEREOF AND COMPUTER-READABLE STORAGE MEDIUM

CROSS-REFERENCE TO RELATED APPLICATION

The present application claims the priority to Chinese Patent Application No. 201810399386.6 filed on Apr. 28, 2018, entitled "MOUSE AND USAGE THEREOF", the entire contents of which are incorporated herein by reference.

TECHNICAL FIELD

The present application relates to a mouse and a controlling method thereof, and a computer-readable storage medium.

BACKGROUND

The computer mouse is an input device of a computer, and is used to control the movement and positioning of a cursor. The use of the mouse makes the operations on the computer easier and faster.

However, the functionality of the above-mentioned mouse is relatively simple.

SUMMARY

Embodiments of the present application provide a mouse, a controlling method thereof and a computer-readable storage medium.

In one aspect, there is provided a mouse, comprising: an upper cover and two mouse halves, wherein a scroll wheel assembly is located between the two mouse halves, each of the mouse halves has a keypad and a joystick, the keypads and the joysticks are located inside the mouse, the joysticks on the two mouse halves are movably connected to the scroll wheel assembly respectively, the mouse further comprises at least one position adjusting part each connected to the scroll wheel assembly and one of the mouse halves, wherein the at least one position adjusting part is configured for controlling the two mouse halves to move toward or away from each other.

In some embodiments, the mouse comprises two position adjusting parts, wherein the two position adjusting parts are in one-to-one correspondence with the two mouse halves, each of the position adjusting parts includes one slider, and each of the sliders is located at a front end of one of the mouse halves, each of the sliders has a compartment having a sliding shaft and a drive mechanism therein, the drive mechanism is movably connected to the sliding shaft and is connected to a corresponding mouse half, the sliding shaft is fixedly connected to the scroll wheel assembly, and the drive mechanism moves axially relative to the sliding shaft by the connection of the sliding shaft to drive the corresponding mouse half to move in a direction toward or away from the scroll wheel assembly.

In some embodiments, each of the sliders further has a rotating shaft connected to a corresponding keypad and a corresponding mouse half, and the keypad is capable of being turned over by the rotating shaft.

In some embodiments, the mouse further comprises a controller, wherein each of the drive mechanisms includes an electric motor and an output shaft, the electric motor is electrically connected to the controller, and an outer surface of the output shaft is threadedly sleeved with the sliding shaft; the controller is configured to control the electric motors of the two position adjusting parts to drive a corresponding output shaft to rotate upon receiving a first control command, the rotating output shaft moves axially by the connection of the corresponding sliding shaft to drive a corresponding mouse half to move in a direction toward the scroll wheel assembly, and the first control command is used to instruct the two mouse halves to move toward each other; and the controller is further configured to control the electric motors of the two position adjusting parts to drive a corresponding output shaft to rotate upon receiving a second control command, the rotating output shaft moves axially by the connection of the corresponding sliding shaft to drive a corresponding mouse half to move in a direction away from the scroll wheel assembly, and the second control command is used to instruct the two mouse halves to move away from each other.

In some embodiments, the scroll wheel assembly has an adjustment button electrically connected to the controller, and when the adjustment button is pressed, a control command is sent to the controller, wherein the control command is the first control command or the second control command.

In some embodiments, the scroll wheel assembly comprises a scroll wheel and a support, the scroll wheel being located on the support, the joysticks on the two mouse halves are hinged to the support respectively, and the sliding shaft is movably connected to the support.

In some embodiments, the rotating shaft is fixedly connected to a corresponding keypad and is further movably connected to a corresponding mouse half, and each of the sliders further has a limiting plate for limiting the degree of horizontal displacement of the rotating shaft.

In some embodiments, one side of the scroll wheel assembly connected to the sliding shaft has a slot, the length direction of the slot is perpendicular to the height direction of the mouse, one end of the sliding shaft is clamped in the slot.

In some embodiments, each of the drive mechanisms further comprises a speed limiter electrically connected to the electric motor.

In another aspect, there is provided a method of controlling a mouse, wherein the mouse comprises an upper cover and two mouse halves, a scroll wheel assembly is located between the two mouse halves, each of the mouse halves has a keypad and a joystick, the keypads and the joysticks are located inside the mouse, the joysticks on the two mouse halves are movably connected to the scroll wheel assembly respectively, and the mouse further comprises at least one position adjusting part each connected to the scroll wheel assembly and one of the mouse halves; the mouse further comprises a controller, a left button and a right button being located at a front end of the upper cover of the mouse; and the method comprises: after the upper cover of the mouse is removed, when the controller receives a second control command, instructing, by the controller, the at least one position adjusting part to control the two mouse halves to move away from each other; and when the controller detects that at least one of the keypad and the joystick is operated, sending, by the controller, a first instruction signal to a terminal so that the terminal performs a corresponding operation according to the first instruction signal; when the gamepad function of the mouse is not needed and when the controller receives a first control command, instructing, by the controller, the at least one position adjusting part to control the two mouse halves to move toward each other; and after the upper cover of the mouse is coupled to the two halves and forms an top surface of the mouse, when the controller detects that a button on the mouse is pressed or the mouse is moved, sending, by the controller, a second instruction signal to the terminal so that the terminal performs a corresponding operation according to the second instruction signal, the button being the left button or the right button.

In some embodiments, the first instruction signal is a direction instruction signal, and said when the controller detects that at least one of the keypad and the joystick is operated, sending, by the controller, a first instruction signal to a terminal comprises: when the controller detects that the joystick is operated, generating, by the controller, the direction instruction signal, and sending the direction instruction signal to the terminal, so that the terminal controls the movement of a target object according to the direction instruction signal.

In some embodiments, the first instruction signal is a keypad signal, and said when the controller detects that at least one of the keypad and the joystick is operated, sending, by the controller, a first instruction signal to a terminal comprises: when the controller detects that the keypad is operated, generating, by the controller, the keypad signal, and sending the keypad signal to the terminal, so that the terminal performs a corresponding operation according to the keypad signal.

In some embodiments, the mouse comprises two position adjusting parts, the two position adjusting parts are in one-to-one correspondence with the two mouse halves, each of the position adjusting parts includes one slider each located at a front end of one of the mouse halves; each of the sliders has a compartment having a sliding shaft and a drive mechanism therein, the drive mechanism is movably connected to the sliding shaft and is connected to a corresponding mouse half, the sliding shaft is fixedly connected to the scroll wheel assembly, said instructing, by the controller, the at least one position adjusting part to control the two mouse halves to move away from each other comprises: instructing, by the controller, each of the drive mechanisms to move axially relative to the sliding shaft by the connection of a corresponding sliding shaft in a direction away from the scroll wheel assembly to drive a corresponding mouse half to move in a direction away from the scroll wheel assembly; and said instructing, by the controller, the at least one position adjusting part to control the two mouse halves to move toward each other comprises: instructing, by the controller, each of the drive mechanisms to move axially relative to the sliding shaft by the connection of a corresponding sliding shaft in a direction toward the scroll wheel assembly to drive a corresponding mouse half to move in a direction towards the scroll wheel assembly.

In some embodiments, each of the drive mechanisms includes an electric motor and an output shaft, the electric motor is electrically connected to the controller, and an outer surface of the output shaft is threadedly sleeved with the sliding shaft; said instructing, by the controller, each of the drive mechanisms to move axially relative to the sliding shaft by the connection of a corresponding sliding shaft comprises: controlling, by the controller, the electric motors of the two position adjusting parts to drive a corresponding output shaft to rotate, and the rotating output shaft moves axially by the connection of the corresponding sliding shaft.

In some embodiments, the scroll wheel assembly has an adjustment button electrically connected to the controller, after the upper cover of the mouse is removed, the method further comprises: after the adjustment button is pressed, receiving, by the controller, the control command sent by the adjustment button, wherein the control command is the first control command or the second control command.

In some embodiments, the controller determines the type of the control command according to the duration that the adjustment button is pressed.

In some embodiments, the controller determines the type of the control command according to the frequency at which the adjustment button is pressed within a specified duration.

In some embodiments, the controller determines the type of the control command according to the pressure under which the adjustment button is pressed.

In yet another aspect, there is provided a computer-readable storage medium, comprising instructions therein that, when executed by a processor, implement the control process of a mouse, the mouse comprises an upper cover and two mouse halves, wherein a scroll wheel assembly is located between the two mouse halves, each of the mouse halves has a keypad and a joystick, the keypads and the joysticks are located inside the mouse, the joysticks on the two mouse halves are movably connected to the scroll wheel assembly respectively, the mouse further comprises at least one position adjusting part each connected to the scroll wheel assembly and one of the mouse halves, a left button and a right button being located at a front end of the upper cover of the mouse; the control process comprises: instructing the at least one position adjusting part to control the two mouse halves to move away from each other upon receiving a second control command, and sending a first instruction signal to a terminal when detecting that at least one of the keypad and the joystick is operated, so that the terminal performs a corresponding operation according to the first instruction signal; instructing the at least one position adjusting part to control the two mouse halves to move toward each other upon receiving a first control command; and sending a second instruction signal to the terminal when detecting that a button on the mouse is pressed or the mouse is moved, so that the terminal performs a corresponding operation according to the second instruction signal, the button being the left button or the right button.

BRIEF DESCRIPTION OF THE DRAWINGS

To more clearly describe the technical solutions in the embodiments of the present disclosure, now brief introduction will be made as follows with respect to the accompanying drawings which may be useful and required for the description of the embodiments. Apparently, the accompanying drawings in the following description are merely representatives of some of the embodiments of the present application. A person of ordinary skill in the art could obtain other drawings based on these accompanying drawings without creative efforts.

DETAILED DESCRIPTION

The principles and advantages of the present application will be more apparent from the following detailed description of the embodiments of the present application along with the accompanying drawings.

Figure 1:
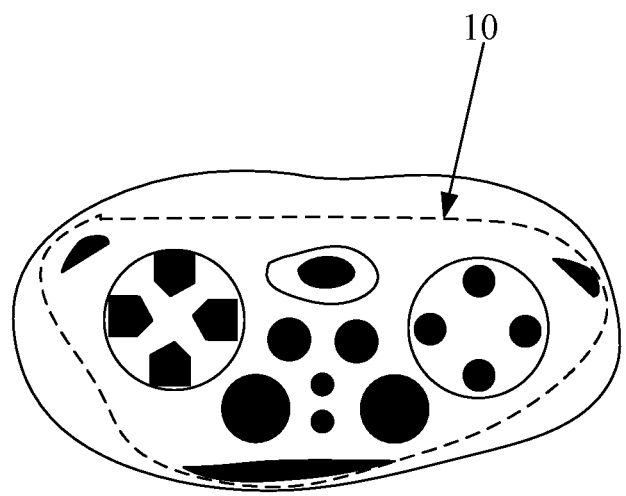
FIG. 1 is a schematic diagram of a structure of a mouse known to the inventors.
Figure 2:
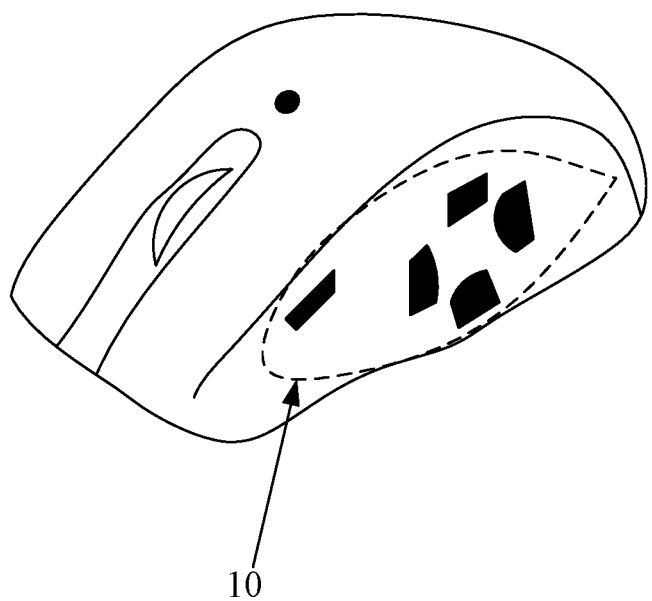
FIG. 2 is a schematic diagram of a structure of another mouse known to the inventors.

As is known to the inventor, in addition to control the movement and positioning of the cursor, some types of mouse further have the function of a gamepad, which could realize the control of virtual game characters through the manipulation of the mouse. FIGS. 1 and 2 show schematic diagrams of the structures of two types of mouse known to the inventors. FIG. 1 is a bottom view of a mouse in which a gamepad structure 10 is located at the bottom of the mouse. FIG. 2 is a perspective view of a mouse in which the gamepad structure 10 is located at one side of the mouse. It could be seen that, the position of the gamepad structure on the mouse is always fixed, and the function of the mouse is relatively simple. The size of the gamepad structure is limited by the size of the mouse, and the gamepad structure cannot be adjusted, thereby failing to meet the using habits of different users and resulting in poor flexibility in use.

The mouse in an embodiment of the present application includes two mouse halves and at least one position adjusting part. The at least one position adjusting part is capable of controlling the two mouse halves to move toward or away from each other. The mouse has more abundant functions, and the gamepad structure on the mouse could be adjusted to meet the using habits of different users, thereby improving the flexibility in use.

Figure 3:
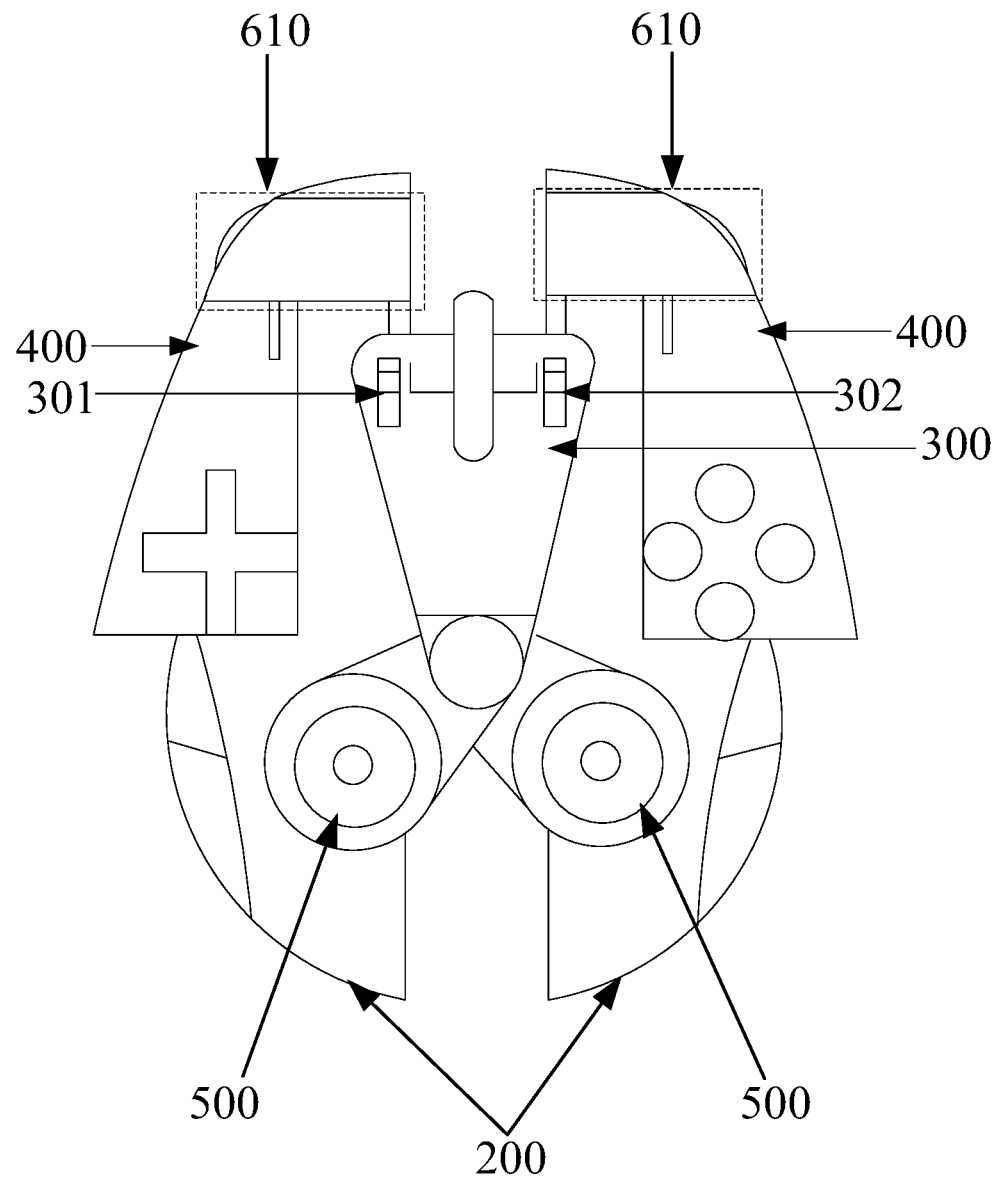
FIG. 3 is a schematic diagram of an internal structure of a mouse when it is fully deployed provided according to an embodiment of the present disclosure.

FIG. 3 is a schematic diagram of an internal structure of a mouse when fully deployed according to an embodiment of the present application, which is a top view. Referring to FIG. 3, the mouse includes an upper cover (not shown in FIG. 3) and two mouse halves 200. The upper cover could be coupled to the two halves and forms the top surface of the mouse. A scroll wheel assembly 300 is located between the two mouse halves 200. Each mouse half 200 has a keypad 400 and a joystick 500. The keypad 400 and the joystick 500 are located inside the mouse. The joysticks 500 on the two mouse halves 200 are movably connected to the scroll wheel assembly 300, respectively.

The mouse also includes at least one position adjusting part 610 (FIG. 3 exemplarily shows two position adjusting parts 610), each of which is connected to one mouse half 200 and the scroll wheel assembly 300.

The at least one position adjusting part 610 is configured to control the two mouse halves 200 to move toward or away from each other.

When the mouse provided by the embodiment of the present application is used, if the upper cover of the mouse is not removed, the mouse may act as a device for manually controlling the position of the cursor, which could achieve the cursor positioning function; otherwise, if the upper cover is removed, the mouse may act as a component of an electronic game machine and could achieve the gamepad function to control a virtual game character. When using the gamepad function of the mouse, the two mouse halves could be controlled, by at least one position adjusting part, to move toward or away from each other. When the two mouse halves move toward each other, the mouse is closed and the size of the gamepad structure may become smaller. When the two mouse halves move away from each other, the mouse is deployed and the size of the gamepad structure may become larger. Therefore, the gamepad structure on the mouse could be adjusted, and the size of the gamepad structure may be made larger or smaller, thereby satisfying the using habits of different users and improving the flexibility in use.

In one implementation, the mouse may include one position adjusting part. When the mouse includes one position adjusting part, the position adjusting part is connected to one mouse half and the scroll wheel assembly. At this time, the position adjusting part may control a corresponding mouse half to move in a direction toward the scroll wheel assembly, or control a corresponding mouse half to move in a direction away from the scroll wheel assembly. For example, the position adjusting part is connected to the left mouse half and the scroll wheel assembly respectively, then the position adjusting part may control the left mouse half to move in a direction toward or away from the scroll wheel assembly. When the position adjusting part controls the left mouse half to move in a direction toward the scroll wheel assembly, the right mouse half does not move while the left mouse half moves toward the right mouse half. As such, the distance between the two mouse halves is reduced, and the two mouse halves move toward each other. When the position adjusting part controls the left mouse half to move in a direction away from the scroll wheel assembly, the right mouse half does not move while the left mouse half moves away from the right mouse half. As such, the distance between the two mouse halves is increased, and the two mouse halves move away from each other.

In another implementation, as shown in FIG. 3, the mouse may include two position adjusting parts 610. The two position adjusting parts 610 are in one-to-one correspondence with the two mouse halves 200. Each position adjusting part 610 is connected to one mouse half 200 and the scroll wheel assembly 300, respectively. The two position adjusting parts are symmetrically located on two sides of the scroll wheel assembly, and may control the two mouse halves to move in a direction toward or away from the scroll wheel assembly, thereby controlling the two mouse halves to move toward or away from each other, which may speed up the closing or deployment speed of the mouse and make the mouse look more beautiful.

In an embodiment of the present application, the mouse further includes a controller. Exemplarily, the controller may include a processor or a processing chip. The controller may be located in either of the mouse halves, and may be located in any position adjusting part. The setting position of the controller is not limited in the embodiment of the present application.

Assuming that the upper cover of the mouse is not removed, the mouse may implement a cursor positioning function. A left button and a right button are provided at a front end of the upper cover of the mouse. Referring to FIG. 3, the scroll wheel assembly 300 includes a first micro switch 301 and a second micro switch 302. The first micro switch 301 is located below the left button and is electrically connected to the controller. The second micro switch 302 is located below the right button and is electrically connected to the controller. When a button on the mouse is pressed once, a metal reed in a corresponding micro switch is triggered once, and the controller electrically connected to the micro switch generates a click signal and sends it to a terminal. As an example, the controller sends the click signal to the terminal through a signal transmission module in the mouse. At the same time, the micro switch is reset. Thereafter, the terminal performs a corresponding click operation according to the click signal, for example, opening a webpage link or the like.

Figure 4:
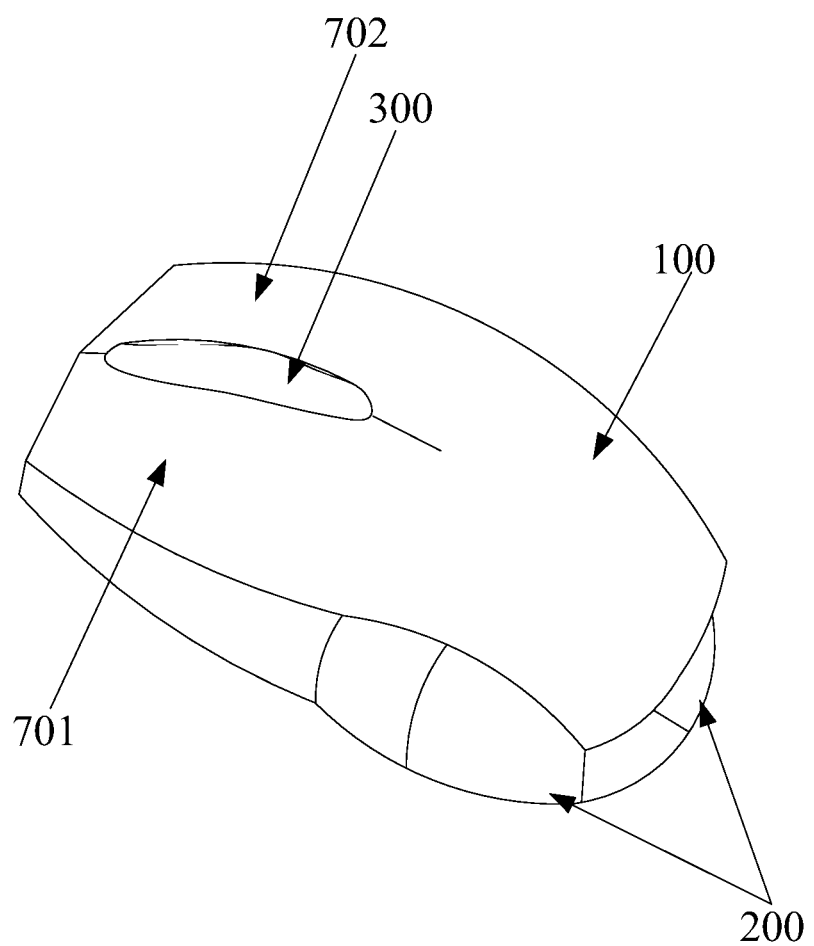
FIG. 4 is a schematic diagram of an external structure of the mouse shown in FIG. 3 when it is not deployed.

FIG. 4 is a schematic diagram showing an external structure of the mouse shown in FIG. 3 when it is not deployed (i.e., it is closed). Referring to FIG. 4, without removing the upper cover of the mouse, the mouse includes an upper cover 100 and two mouse halves 200. There is a scroll wheel assembly 300 located between the two mouse halves 200. A left button 701 and a right button 702 are located at the front end of the upper cover 100. A first micro switch is provided below the left button 701 and a second micro switch is provided below the right button 702. A user may achieve the purpose of pressing the first micro switch through pressing the left button 701, and achieve the purpose of pressing the second micro switch through pressing the right button 702. When a micro switch is pressed, the controller sends a click signal to a terminal so that the terminal performs a corresponding click operation according to the click signal, thereby implementing the click function related to the cursor positioning function.

In order to implement the cursor positioning function, the mouse provided by the embodiment of the present application further includes a cursor positioning structure. For example, the cursor positioning structure may include a light-emitting diode, optical lens, and a light sensing device. The cursor positioning structure is connected to the controller. Further, the cursor positioning structure is electrically connected to the controller. The cursor positioning structure is configured to collect the movement track information of the mouse and the controller is configured to determine the moving direction and the moving distance of the mouse according to the movement track information. Thereafter, the controller sends to the terminal a signal used to indicate the moving direction and the moving distance of the mouse, so that the terminal performs a cursor positioning operation, thereby implementing the cursor positioning function.

The appearance of the mouse provided by the embodiment of the present application when not deployed is the same as that of the mouse known by the inventor. When the mouse provided by the embodiment of the present application is not deployed, the user could control the movement and positioning of the cursor through the mouse, and realize the click function, so that the operation on the terminal is more convenient and quick.

The mouse provided by the embodiment of the present application may establish a wired connection or a wireless connection with the terminal. When the mouse establishes a wireless connection with the terminal, exemplarily, the mouse may have a Bluetooth connection function.

In summary, the mouse provided by the embodiment of the present application includes two mouse halves and at least one position adjusting part. Each mouse half has a keypad and a joystick. The keypads and the joysticks are located inside the mouse. The joysticks on the two mouse halves are movably connected to the scroll wheel assembly respectively. Each position adjusting part is connected to one mouse half and the scroll wheel assembly. The at least one position adjusting part could control the two mouse halves to move toward or away from each other, thereby enriching the functions of the mouse. The gamepad structure on the mouse could be adjusted, and the size of the gamepad structure may become larger or smaller, thereby satisfying the using habits of different users and increasing the flexibility in use.

Figure 5:
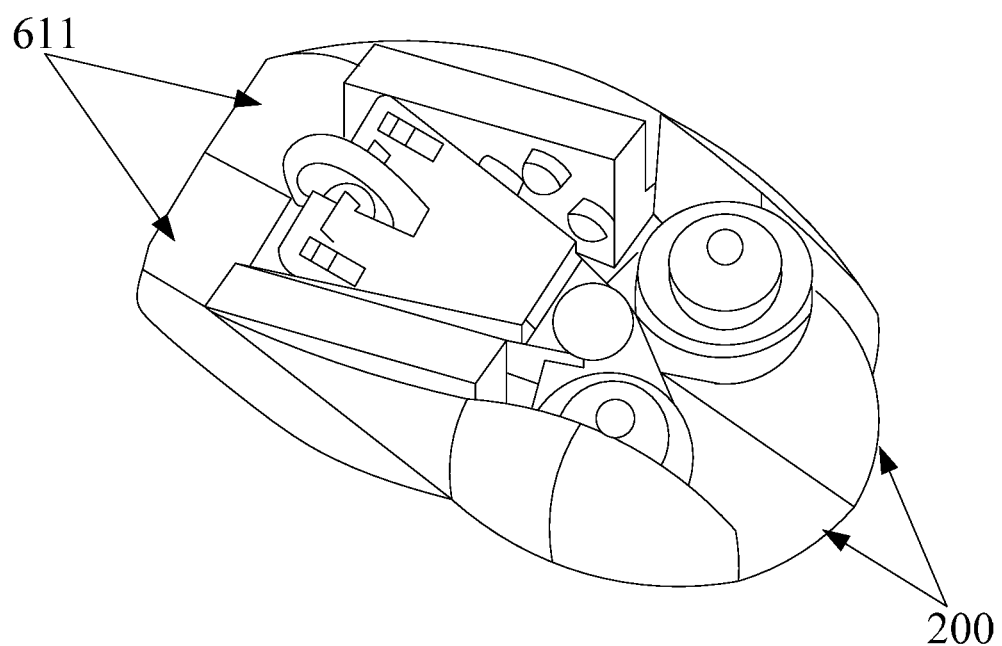
FIG. 5 is a schematic diagram of an internal structure of the mouse shown in FIG. 3 when it is not deployed.
Figure 6:
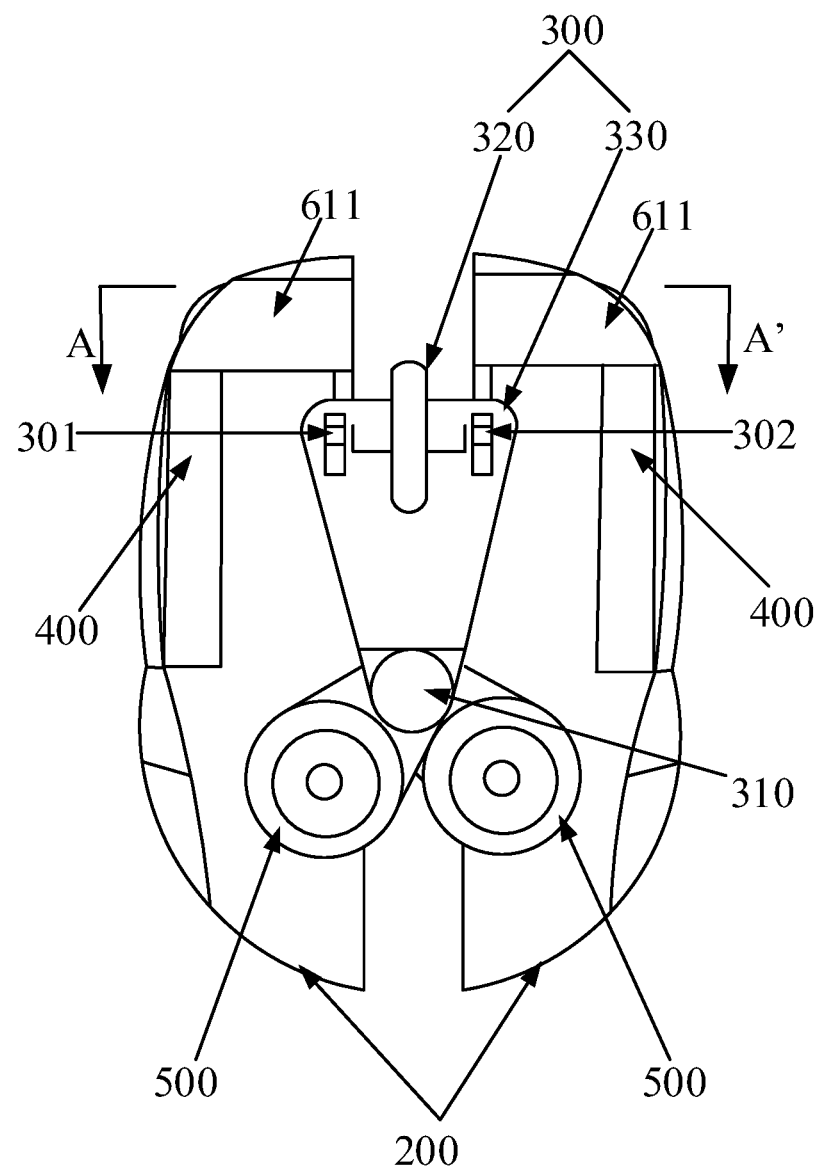
FIG. 6 is a schematic diagram of an internal structure of the mouse shown in FIG. 3 when it is semi-deployed.

For example, FIG. 5 shows a schematic diagram of an internal structure of the mouse shown in FIG. 3 when not deployed. Referring to FIG. 5, each position adjusting part includes one slider 611. Each slider 611 is located at a front end of one mouse half 200. By way of example, FIG. 6 shows a top view of the mouse when the mouse shown in FIG. 5 is semi-deployed to implement the gamepad function. Referring to FIG. 6, the mouse includes two mouse halves 200 with a scroll wheel assembly 300 located between the two mouse halves 200. The scroll wheel assembly 300 includes a first micro switch 301 and a second micro switch 302. The first micro switch 301 is located below a left button. The second micro switch 302 is located below a right button. Each mouse half 200 has a keypad 400 and a joystick 500. The joysticks 500 on the two mouse halves 200 are movably connected to the scroll wheel assembly 300, respectively. The mouse further includes two position adjusting parts that are in one-to-one correspondence with the two mouse halves 200, and each of the two position adjusting parts is connected to one mouse half 200 and the scroll wheel assembly 300. Each position adjusting part includes one slider 611. Each slider 611 is located at a front end of one mouse half 200. The two position adjusting parts are symmetrically located on two sides of the scroll wheel assembly for controlling the movement of the two mouse halves away from the scroll wheel assembly, so that the mouse is in a semi-deployed state.

Figure 7A:
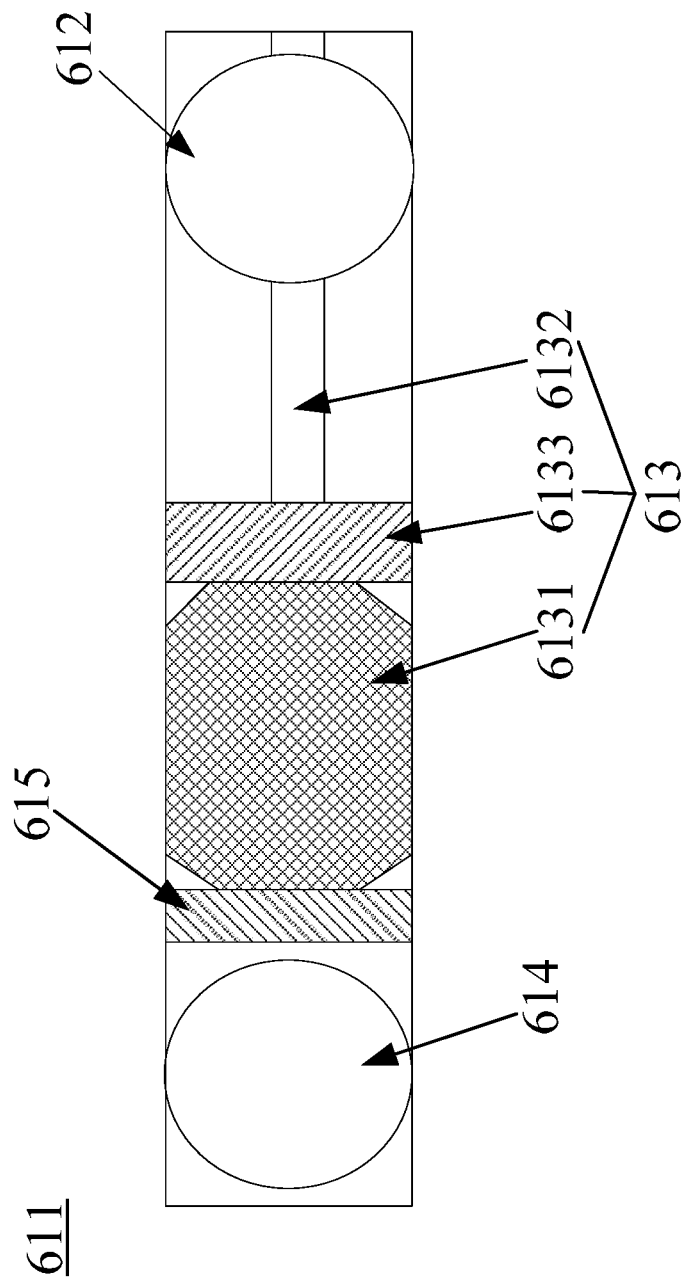
FIG. 7A is a schematic longitudinal cross-sectional view of a slider provided according to an embodiment of the present disclosure.

By way of example, FIG. 7A shows a schematic longitudinal cross-sectional view of the slider 611 (said longitudinal cross-sectional is the A-A' cross section in FIG. 6). Referring to FIG. 7A, each of the sliders 611 has a compartment having a sliding shaft 612 and a drive mechanism 613 therein. The drive mechanism 613 is movably connected to the sliding shaft 612. The drive mechanism 613 is connected to a corresponding mouse half. The sliding shaft 612 is fixedly connected to the scroll wheel assembly. The drive mechanism 613 moves axially relative to the sliding shaft 612 by the connection of the sliding shaft 612. The drive mechanism 613 could drive the corresponding mouse half to move in a direction toward or away from the scroll wheel assembly.

By way of example, referring to FIG. 7A, each drive mechanism 613 may include an electric motor 6131 and an output shaft 6132. The electric motor 6131 is electrically connected to the controller. The outer surface of the output shaft 6132 is threadedly sleeved with the sliding shaft 612. In FIG. 7A, the longitudinal direction of the slide shaft 612 is perpendicular to the paper, and the longitudinal direction of the output shaft 6132 is perpendicular to the longitudinal direction of the slide shaft 612. The outer surface of the output shaft 6132 is provided with an external thread, and the side surface of the sliding shaft 612 has a through hole having an internal thread, and the external thread of the output shaft 6132 cooperates with the internal thread of the through hole of the sliding shaft 612 to achieve the aforementioned screw connection. When the electric motor 6131 drives the output shaft 6132 to rotate, since the outer surface of the output shaft 6132 is threadedly sleeved with the sliding shaft 612 which is fixedly connected to the scroll wheel assembly and is stationary with respect to the scroll wheel assembly, the output shaft 6132 will, during the rotation, be moved axially by the connection of the sliding shaft 612, that is, the output shaft 6132 moves axially along the axis direction of the output shaft 6132, thereby moving in a direction toward or away from the scroll wheel assembly. Since the drive mechanism 613 is connected to a corresponding mouse half, the drive mechanism 613 could drive the corresponding mouse half to move in a direction toward or away from the scroll wheel assembly.

The compartment may have a support therein. The electric motor 6131 may be located in the support.

Figure 7B:
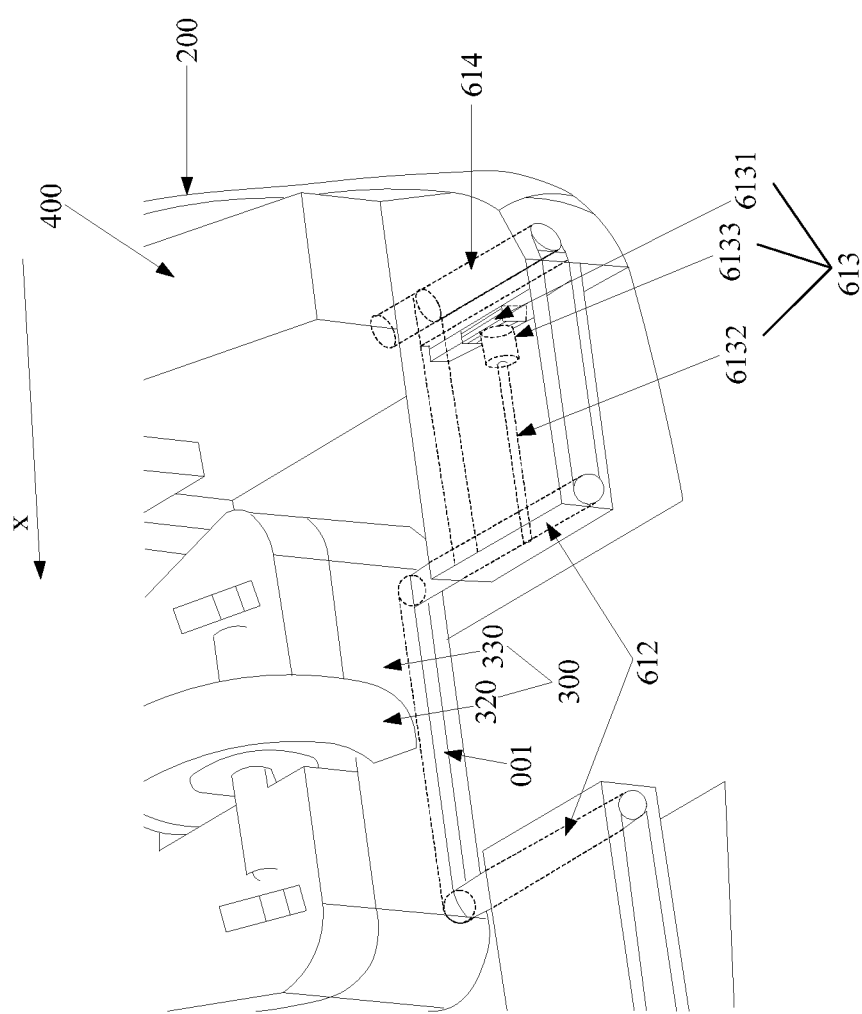
FIG. 7B is a schematic view of a connection of a slider to a scroll wheel assembly provided according to an embodiment of the present disclosure.

By way of example, FIG. 7B shows a schematic view of the connection of the slider with the scroll wheel assembly. Referring to FIG. 7B, each position adjusting part includes one slider that is located at the front end of one mouse half. The compartment of the slider has a sliding shaft 612 and a drive mechanism 613 therein. The drive mechanism 613 is movably connected to the sliding shaft 612. The drive mechanism 613 is connected to a corresponding mouse half. The drive mechanism 613 includes an electric motor 6131 and an output shaft 6132. The outer surface of the output shaft 6132 is threadedly sleeved with the sliding shaft 612. The longitudinal direction of the output shaft 6132 is perpendicular to the longitudinal direction of the sliding shaft 612. The sliding shaft 612 is fixedly connected to the scroll wheel assembly 300. The scroll wheel assembly 300 includes scroll wheel 320 and support 330.

When the electric motor 6131 drives the output shaft 6132 to rotate, since the outer surface of the output shaft 6132 is threadedly sleeved with the sliding shaft 612 which is fixed on the scroll wheel assembly 300 and remains stationary, the output shaft 6132 will, during rotation, move in a direction toward or away from the scroll wheel assembly 300. Since the drive mechanism is connected to a corresponding mouse half, the drive mechanism could drive the corresponding mouse half to move in a direction toward or away from the scroll wheel assembly 300. The direction toward the scroll wheel assembly 300 is the direction indicated by x in FIG. 7B, and the direction away from the scroll wheel assembly 300 is the opposite direction of the direction indicated by x.

When the rotation direction of the output shaft 6132 driven by the electric motor 6131 changes, the movement direction of the output shaft 6132 changes. For example, when the electric motor 6131 drives the output shaft 6132 to rotate counterclockwise, the corresponding mouse half driven by the drive mechanism moves in a direction toward the scroll wheel assembly 300; while the electric motor 6131 drives the output shaft 6132 to rotate clockwise, the corresponding mouse half driven by the drive mechanism moves in a direction away from the scroll wheel assembly 300.

In some embodiments, referring to FIG. 6, the scroll wheel assembly 300 includes a scroll wheel 320 and a support 330. The scroll wheel 320 is located on the support 330. By way of example, the scroll wheel 320 and the support 330 may be coupled together. The first micro switch 301 and the second micro switch 302 are located on two sides of the scroll wheel 320 respectively. The joysticks 500 on the two mouse halves 200 are hinged to the support 330, respectively, to facilitate routing and angle adjustment. Referring to FIG. 7B, the sliding shaft 612 is movably connected to the support 330.

In an implementation, the side of the scroll wheel assembly connected to the sliding shaft may have a slot. The length direction of the slot is perpendicular to the height direction of the mouse. One end of the sliding shaft is clamped in the slot. The length of the slot is greater than the diameter of the sliding shaft. Since the length of the slot is greater than the diameter of the sliding shaft, the sliding shaft may be located at different positions of the slot along the length direction of the slot. When the sliding shaft is located in the slot and is closer to the scroll wheel of the scroll wheel assembly, the overall width of the fully deployed gamepad structure is less. When the sliding shaft is located in the slot and is farther from the scroll wheel, the overall width of the fully deployed gamepad structure is greater. By way of example, referring to FIG. 7B, the side of the scroll wheel assembly 300 connected to the sliding shaft 612 has a slot 001. One end of the sliding shaft 612 is clamped in the slot 001. The user may adjust the located position of the sliding shaft 612 on the scroll wheel assembly 300 according to the actual use requirement and may adjust the position of the sliding shaft 612 in the slot 001 as needed. For example, the sliding shaft 612 may be located in the slot 001 at a position far from the scroll wheel of the scroll wheel assembly, so that the overall width of the deployed mouse, i.e., the gamepad structure, is larger. As another example, the sliding shaft 612 may be located in the slot 001 at a position closer to the scroll wheel, so that the overall width of the deployed mouse, i.e., the gamepad structure is smaller.

In the embodiment of the present application, the two mouse halves may be brought close to or away from each other through the sliding shaft and the drive mechanism, thereby realizing the closing and deployment of the mouse. When the mouse is deployed, the mouse's gamepad function could be used. When the mouse is closed and the upper cover is not coupled to the two halves, the mouse's gamepad function could be used. When the mouse is closed and the upper cover is coupled to the two halves and forms the top surface of the mouse, the mouse's cursor positioning function could be used. The mouse not only has a cursor positioning function, but also has a gamepad function. Moreover, the size of the gamepad structure could be adjusted.

Assume that the mouse includes two position adjusting parts. By way of example, referring to FIG. 7B, the controller in the mouse is configured to:

upon receiving a first control command, control the electric motors 6131 of the two position adjusting parts to drive a corresponding output shaft 6132 to rotate, wherein the rotating output shaft 6132 moves axially by the connection of the corresponding sliding shaft 612 to drive a corresponding mouse half to move in a direction toward the scroll wheel assembly 300, the first control command is used to instruct the two mouse halves 200 to move toward each other; and upon receiving a second control command, control the electric motors 6131 of the two position adjusting parts to drive a corresponding output shaft 6132 to rotate, wherein the rotating output shaft 6132 moves axially by the connection of the corresponding sliding shaft 612 to drive a corresponding mouse half to move in a direction away from the scroll wheel assembly 300, and the second control command is used to instruct the two mouse halves 200 to move away from each other.

The rotation direction of the output shaft 6132 driven by the electric motor 6131, which is controlled by the controller upon receiving the first control command, is opposite to that of the output shaft 6132 driven by the electric motor 6131, which is controlled by the controller upon receiving the second control command. For example, upon receiving the first control command, the controller may control the electric motor 6131 to drive the output shaft 6132 to rotate clockwise. Upon receiving the second control command, the controller may control the electric motor 6131 to drive the output shaft 6132 to rotate counterclockwise.

Referring to FIG. 7A, each of the drive mechanisms 613 may further include a speed limiter 6133 electrically connected to the electric motor 6131. The speed limiter 6133 is configured for controlling the rotational speed of the output shaft 6132 to be slower than a preset rotational speed through the electric motor 6131. The speed limiter 6133 controls the rotational speed of the output shaft 6132, so that the speed of the output shaft 6132 moving in a direction toward or away from the scroll wheel assembly may be reduced. As such, the speed at which the two mouse halves move toward or away from each other could be decreased, and thus the speed at which the mouse become closed or deployed could also be reduced.

The preset rotational speed could be set according to actual needs. For example, the preset rotational speed may be 10 revolutions/second (i.e., 10 revolutions per second).

Referring to FIG. 7A, the slider 611 may also have a rotating shaft 614. The rotating shaft 614 is connected to a corresponding keypad and is also connected to a corresponding mouse half. The keypad could be turned over around the rotating shaft 614. For example, referring to FIG. 6, when the two position adjusting parts control the two mouse halves to move in a direction away from the scroll wheel assembly so that the mouse is in a semi-deployed state, in order to use the gamepad function of the mouse, the keypad 400 could be rotated, so that the plate surface of the keypad 400 is parallel to the bottom surface of the mouse.

In an implementation, the rotating shaft 614 may be fixedly connected to a corresponding keypad and movably connected to a corresponding mouse half. The keypad could be turned over as the rotating shaft rotates. In this implementation, referring to FIG. 7B, each of the sliders may further have a limiting plate 615 for limiting the degree of horizontal displacement of the rotating shaft 614 to prevent the rotating shaft 614 from having a large horizontal displacement. The horizontal displacement of the rotating shaft refers to the displacement generated when the rotating shaft in rotation moves along the length of the compartment.

Referring to FIG. 7B, the rotating shaft 614 is fixedly connected to a corresponding keypad 400 and is movably connected to a corresponding mouse half 200. For example, the rotating shaft 614 may be threadedly connected with or engaged to corresponding keypad 400.

In addition, in another implementation, the rotating shaft 614 may further be movably connected to the corresponding keypad 400 and fixedly connected to the corresponding mouse half. In this way, the keypad 400 may be turned over around the rotating shaft 614. By way of example, the rotating shaft 614 may be hinged to the corresponding keypad 400.

In the embodiment of the present application, when the rotating shaft 614 is fixedly connected to a corresponding keypad and is movably connected to a corresponding mouse half, the keypad 400 could be turned over with the rotation of the rotating shaft 614. The initial state of the two keypads is an upright state. As shown in FIG. 6, the plate surface of the keypad 400 is perpendicular to the bottom surface of the mouse. When the keypad is used, it may be turned 90 degrees around the rotating shaft, so that the plate surface of the keypad is parallel to the bottom surface of the mouse, as shown in FIG. 3. The keypad could be easily turned over around the rotating shaft in the slider to allow the user to use the keys on the keypad. For example, the keypad may be provided with various types of keys thereon. For example, a direction control key, a speed control key, a page turning key, a prop switching key, etc. may be provided. The structure of the buttons on the keypad may be various. For example, the button may be a button with cross structure.

In the embodiment of the present application, the initial state of the keypad is set as an upright state, so that the overall width of the mouse may be made smaller. The overall height of the mouse may be determined according to the height of the keypad. The height of the keypad may be determined according to the number of keys on the keypad. That is, the overall height of the mouse may be determined according to the number of keys on the keypad. For example, when there are many keys on the keypad, the overall height of the mouse may be set larger. When there are fewer keys on the keypad, the overall height of the mouse may be set smaller.

In some embodiments, as shown in FIG. 6, the scroll wheel assembly 300 has an adjustment button 310 electrically connected to the controller. When the adjustment button 310 is pressed, a control command is sent to the controller. The control command is a first control command or a second control command. The first control command is used to instruct the two mouse halves to move toward each other, while the second control command is used to instruct the two mouse halves to move away from each other. With this adjustment button, the mouse may be deployed and closed quickly and easily.

By way of example, in the embodiment of the present application, the controller may determine the type of the received control command according to the duration the adjustment button is pressed. That is, the controller may determine whether the received control command is the first control command or the second control command according to the duration the adjustment button is pressed. When the adjustment button is pressed for a first duration, the controller determines that the received control command is the first control command. When the adjustment button is pressed for a second duration, the controller determines the received control command is the second control command. The second duration is not equal to the first duration. In some embodiments, the second duration may be greater than the first duration.

For example, when the adjustment button is pressed for 5 seconds, the controller determines that the received control command is the first control command, that is, determines that the received control command is used to instruct the two mouse halves to move toward each other. At this time, the controller controls the electric motors of the two position adjusting parts to drive the output shaft to rotate, so as to drive the corresponding mouse half to move toward the scroll wheel assembly. When the adjustment button is pressed for 10 seconds, the controller determines that the received control command is the second control command, that is, determines that the received control command is used to instruct the two mouse halves to move away from each other. At this time, the controller controls the electric motors of the two position adjusting parts to drive the output shaft to rotate, so as to drive the corresponding mouse half to move in a direction away from the scroll wheel assembly.

In some embodiments, the controller may also determine the type of the control command based on the frequency at which the adjustment button is pressed within a specified duration. The frequency at which the adjustment button is pressed is the total number of times the adjustment button is pressed within the specified duration. The total number of times is proportional to the frequency. The controller may determine whether the received control command is the first control command or the second control command according to the frequency at which the adjustment button is pressed within a specified duration. When the frequency at which the adjustment button is pressed within the specified duration is a first frequency, the controller determines that the received control command is the first control command. When the frequency at which the adjustment button is pressed within the specified duration is a second frequency, the controller determines that the received control command is the second control command. The second frequency is not equal to the first frequency.

In some embodiments, the controller may determine the type of the control command based on the pressure under which the adjustment button is pressed.

Figure 8:
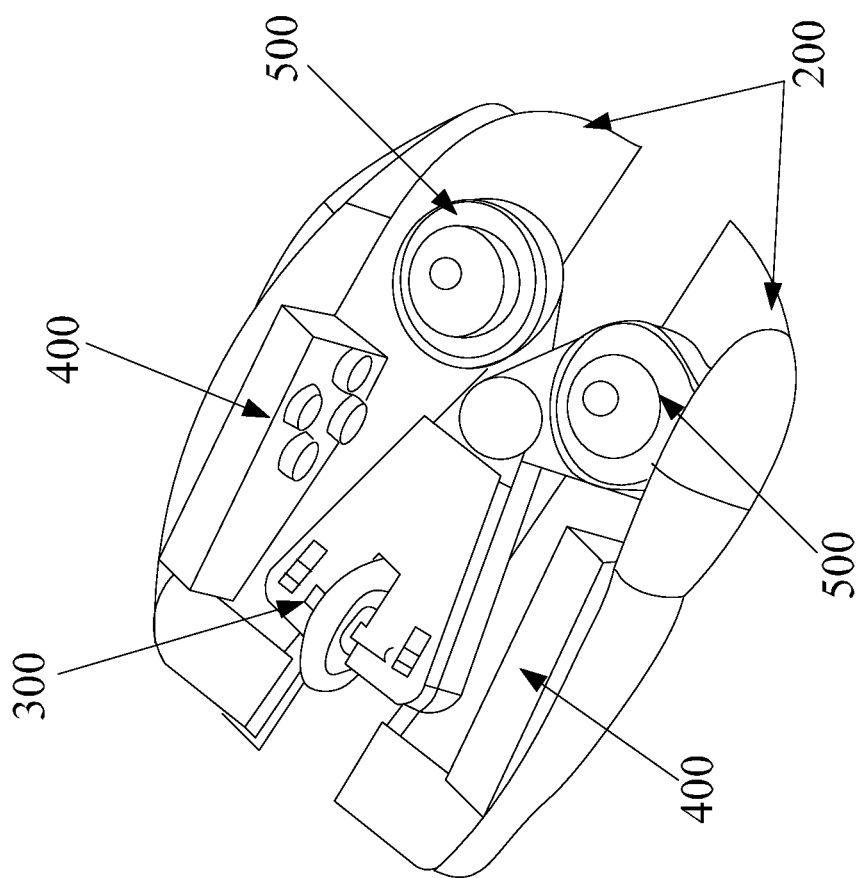
FIG. 8 is a side view of the mouse shown in FIG. 6 in a semi-deployed state.

FIG. 8 shows a side view of the mouse shown in FIG. 6 in a semi-deployed state. Referring to FIG. 8, the mouse includes two mouse halves 200 with a scroll wheel assembly 300 located between the two mouse halves 200. Each mouse half 200 has a keypad 400 and a joystick 500. The joystick 500 is movably connected to the scroll wheel assembly 300. The mouse further includes two position adjusting parts. The two position adjusting parts are in one-to-one correspondence with the two mouse halves 200. The position adjusting part is configured for controlling the two mouse halves to move in a direction away from the scroll wheel assembly, so that the mouse is in a semi-deployed state.

In the embodiment of the present application, after the upper cover of the mouse is removed, the process of implementing the gamepad function by the mouse includes:

upon receiving a direction command, generating, by the controller of the mouse, a direction instruction signal and sending the direction instruction signal to a terminal; thereafter, analyzing and calculating, by the terminal, the direction instruction signal, determining the moving direction and the displacement degree of a target object (such as a virtual game character); and then controlling the movement of the target object, the direction command being generated by a user through operating the joystick, for example, by the user through pushing the joystick forward; and upon receiving a keypad command, generating, by the controller of the mouse, a keypad signal and sending the keypad signal to the terminal; thereafter, performing, by the terminal, a corresponding operation according to the keypad signal, for example, performing a page turning operation or the like, wherein the keypad command being generated by the user through operating a button on the keypad; for example, by the user through pressing a page turning button on the keypad.

For example, the terminal may be a personal computer or a television set or the like.

For example, the mouse provided by the embodiment of the present application may be an optical mouse. In addition, the mouse may also be an optomechanical mouse, an optical mouse, or the like. The type of the mouse is not limited in the embodiment of the present application.

In summary, the mouse provided by the embodiment of the present application includes two mouse halves and at least one position adjusting part. Each mouse half has a keypad and a joystick. The keypads and the joysticks are located inside the mouse. The joysticks on the two mouse halves are movably connected to the scroll wheel assembly respectively. Each position adjusting part is connected to one mouse half and the scroll wheel assembly respectively. The at least one position adjusting part could control the two mouse halves to move toward or away from each other, thereby enriching the functions of the mouse. The gamepad structure on the mouse could be adjusted, and the size of the gamepad structure may become larger or smaller, thereby satisfying the using habits of different users and increasing the flexibility in use.

Figure 9:
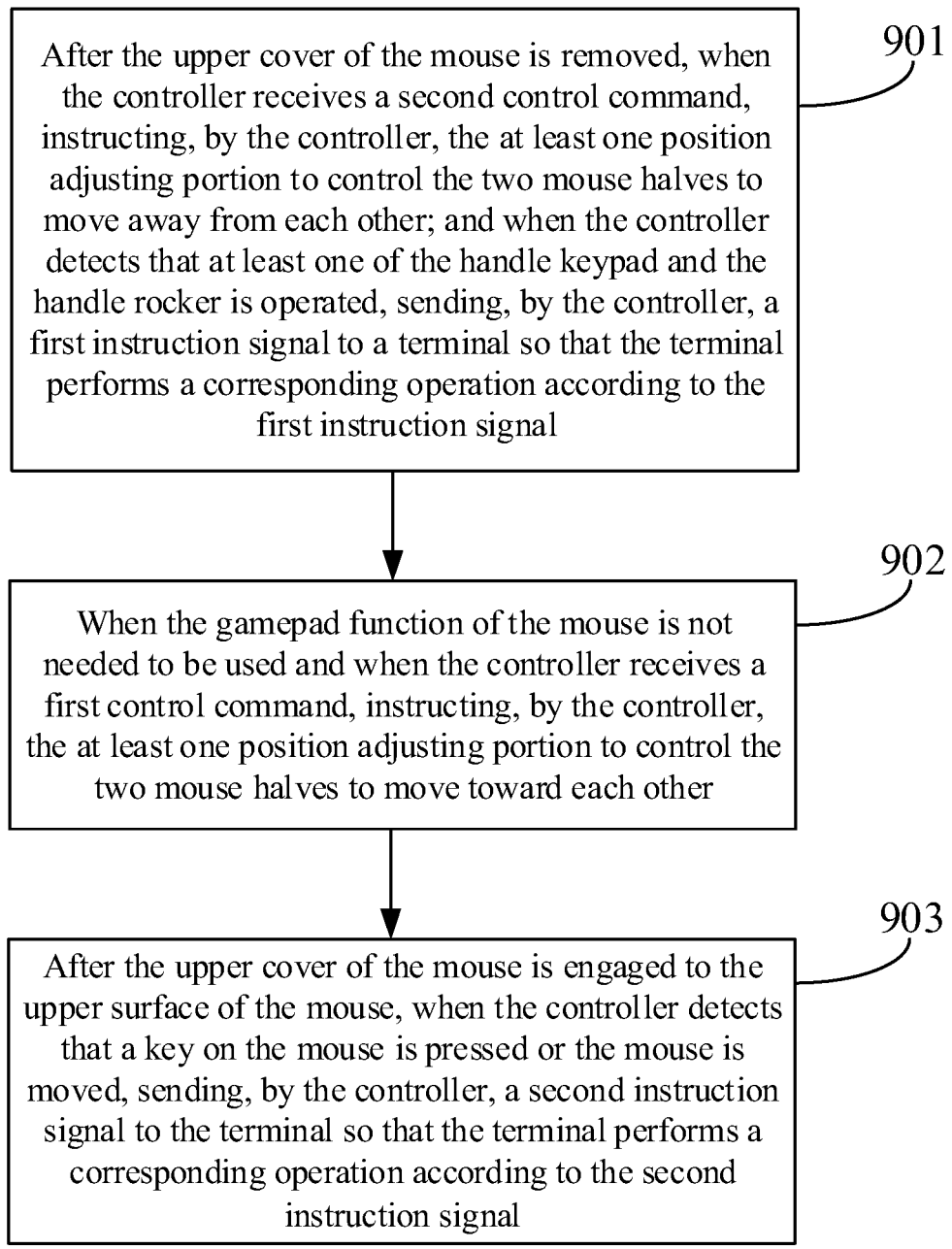
FIG. 9 is a flowchart of a method of controlling a mouse provided according to an embodiment of the present disclosure.

FIG. 9 is a flowchart of a method of controlling a mouse provided according to an embodiment of the present application. The controlling method is applied to a mouse. The mouse includes an upper cover and two mouse halves, a scroll wheel assembly being located between the two mouse halves. Each mouse half has a keypad and a joystick. The keypads and the joysticks are located inside the mouse. The joysticks on the two mouse halves are movably connected to the scroll wheel assembly respectively. The mouse further includes at least one position adjusting part. Each position adjusting part is connected to one mouse half and the scroll wheel assembly. The controlling method may be used in the mouse provided by the above embodiment. For example, the method may be used in the mouse shown in any one of FIG. 3 to FIG. 6 and FIG. 8. The mouse further includes a controller. A left button and a right button are provided at a front end of the upper cover of the mouse. Referring to FIG. 9, the method includes the following steps.

In step 901, after the upper cover of the mouse is removed, when the controller receives a second control command, the controller instructs the at least one position adjusting part to control the two mouse halves to move away from each other, and when the controller detects that at least one of the keypad and the joystick is operated, the controller sends a first instruction signal to a terminal, so that the terminal performs a corresponding operation according to the first instruction signal.

The second control command is used to instruct to deploy the mouse, and is used to instruct the two mouse halves to move away from each other.

In some embodiments, the first instruction signal is a direction instruction signal. Said when the controller detects that at least one of the keypad and the joystick is operated, sending, by the controller, a first instruction signal to a terminal includes:

when the controller detects that the joystick is operated, generating, by the controller, a direction instruction signal and sending the direction instruction signal to the terminal, so that the terminal controls a target object to move according to the direction instruction signal.

In some embodiments, the first instruction signal is a keypad signal. Said when the controller detects that at least one of the keypad and the joystick is operated, sending, by the controller, a first instruction signal to a terminal includes:

when the controller detects that the keypad is operated, generating, by the controller, a keypad signal and sending the keypad signal to the terminal, so that the terminal performs a corresponding operation according to the keypad signal.

In step 902, when the gamepad function of the mouse is not needed, upon receiving the first control command, the controller instructs the at least one position adjusting part to control the two mouse halves to move toward each other.

The first control command is used to instruct to close the mouse, and is used to instruct the two mouse halves to move toward each other.

In step 903, after the upper cover of the mouse is coupled to the two halves and forms the top surface of the mouse, when the controller detects that a button on the mouse is pressed or the mouse is moved, the controller sends a second instruction signal to the terminal, so that the terminal performs a corresponding operation according to the second instruction signal.

The button is a left button or a right button.

In summary, in the method of controlling a mouse provided in the embodiments of the present application, the upper cover of the mouse is removed when a gamepad function of the mouse is needed. When the controller receives a second control command, the controller instructs the at least one position adjusting part to control the two mouse halves to move away from each other. When the gamepad function of the mouse is not needed, the controller instructs the at least one position adjusting part to control the two mouse halves to move toward each other upon receiving a first control command, and then coupling the upper cover of the mouse to the mouse halves. As such, the functions of the mouse is enriched. The gamepad structure on the mouse could be adjusted, and the size of the gamepad structure could become larger or smaller, thereby satisfying the using habits of different users and increasing the flexibility in use.

The method of controlling a mouse provided in the embodiment of the present application will be described by taking the mouse shown in FIG. 6 as an example. Referring to FIG. 6, the mouse includes two position adjusting parts that are in one-to-one correspondence with the two mouse halves 200. Each position adjusting part includes one slider 611. Each slider 611 is located at a front end of one mouse half 200. Referring to FIGS. 7A and 7B, each slider has a compartment and a rotating shaft 614. A sliding shaft 612 and a drive mechanism 613 are located in the compartment. The drive mechanism 613 is movably connected to the sliding shaft 612. The drive mechanism 613 is connected to a corresponding mouse half. The sliding shaft 612 is fixedly connected to the scroll wheel assembly 300. The drive mechanism 613 moves axially relative to the sliding shaft 612 by the connection of the sliding shaft 612. The drive mechanism 613 could drive the corresponding mouse half to move in a direction toward or away from the scroll wheel assembly 300. The rotating shaft 614 is fixedly connected to a corresponding keypad 400 and is movably connected to a corresponding mouse half 200.

In some embodiments, in step 901, instructing, by the controller, the at least one position adjusting part to control the two mouse halves to move away from each other includes: instructing, by the controller, each of the drive mechanisms 613 to move axially relative to the sliding shaft 612 in a direction away from the scroll wheel assembly 300 by the connection of the corresponding sliding shaft 612 to drive the corresponding mouse half 200 to move in a direction away from the scroll wheel assembly 300.

In step 902, instructing, by the controller, the at least one position adjusting part to control the two mouse halves to move toward each other includes: instructing, by the controller, each of the drive mechanisms 613 to move axially relative to the sliding shaft 612 in a direction toward the scroll wheel assembly 300 by the connection of the corresponding sliding shaft 612 to drive the corresponding mouse half 200 to move in a direction toward the scroll wheel assembly 300.

By way of example, the drive mechanism 613 includes an electric motor 6131 and an output shaft 6132. The electric motor 6131 is electrically connected to the controller. An outer surface of the output shaft 6132 is threadedly sleeved with the sliding shaft 612. Instructing, by the controller, each of the drive mechanisms to move axially relative to the sliding shaft by the connection of the corresponding sliding shaft may includes: controlling, by the controller, the electric motors 6131 of the two position adjusting parts to drive the corresponding output shaft 6132 to rotate, the rotating output shaft 6132 moving axially by the connection of the corresponding sliding shaft 612.

For example, the controller may control the electric motors 6131 of the two position adjusting parts to drive the corresponding output shaft 6132 to rotate, the rotating output shaft 6132 moving axially in a direction away from the scroll wheel assembly 300 by the connection of the corresponding sliding shaft 612. As another example, the controller may control the electric motors 6131 of the two position adjusting parts to drive the corresponding output shaft 6132 to rotate, the rotating output shaft 6132 moving axially in a direction toward the scroll wheel assembly 300 by the connection of the corresponding sliding shaft 612.

In some embodiments, as shown in FIG. 6, the scroll wheel assembly 300 has an adjustment button 310 electrically connected to the controller. After the upper cover of the mouse is removed, the controlling method may further include that after the adjustment button 310 is pressed, the controller receives a control command sent by the adjustment button 310, wherein the control command is a first control command or a second control command.

In some embodiments, the controller may determine the type of the control command according to the duration the adjustment button is pressed. That is, the controller may determine whether the received control command is the first control command or the second control command according to the duration the adjustment button is pressed.

In some embodiments, the controller may determine the type of the control command based on the frequency at which the adjustment button is pressed within a specified duration.

In some embodiments, the controller may determine the type of the control command based on the pressure under which the adjustment button is pressed.

By way of example, assuming that the mouse further includes two position adjusting parts, the method of controlling the mouse may include the following work process: 1. the upper cover of the mouse could be removed when the gamepad function of the mouse is needed. After the upper cover of the mouse is removed, when the controller receives the second control command, the controller instructs the electric motors of the two position adjusting parts to drive the output shaft to rotate and drive a corresponding mouse half to move in a direction away from the scroll wheel assembly. When the controller detects that at least one of the keypad and the joystick is operated, the controller sends a first instruction signal to the terminal, so that the terminal performs a corresponding operation according to the first instruction signal.

The second control command is used to instruct to deploy the mouse.

In some embodiments, the scroll wheel assembly is provided with an adjustment button. The user may control the mouse to deploy by pressing the adjustment button. When the user presses the adjustment button, the controller receives the second control command.

Referring to FIG. 7B, upon receiving the second control command, the controller instructs the electric motors 6131 of the two position adjusting parts to drive the output shaft 6132 to rotate and drive a corresponding mouse half 200 to move in a direction away from the scroll wheel assembly 300, so that two mouse halves 200 move away from each other.

By way of example, the first instruction signal is a direction instruction signal. Upon receiving a direction command, the controller generates a direction instruction signal and sends the direction instruction signal to a terminal. The terminal analyzes and calculates the direction instruction signal, determines a moving direction and a displacement degree of a target object, and then controls the movement of the target object. The direction command is generated by a user through operating the joystick, for example, by the user through pushing the joystick forward.

By way of example, the first instruction signal is a keypad signal. Upon receiving a keypad command, the controller generates a keypad signal and sends the keypad signal to a terminal. The terminal performs a corresponding operation according to the keypad signal. The keypad command is generated by a user through operating a button on the keypad, for example, by the user through pressing a page turning button on the keypad. Correspondingly, the terminal performs a page turning operation according to the keypad signal.

2. When the gamepad function of the mouse is not needed, upon receiving the first control command, the controller instructs the electric motors of the two position adjusting parts to drive the output shaft to rotate, and drive a corresponding mouse half to move in a direction toward the scroll wheel assembly.

The first control command is used to instruct to close the mouse.

In some embodiments, the user may control the mouse to close by pressing the adjustment button. The duration the adjustment button is pressed for controlling the mouse to be closed is different from the duration the adjustment button is pressed for controlling the mouse to be deployed. The controller may determine the type of the received control command according to the duration the adjustment button is pressed.

Referring to FIG. 7B, upon receiving the first control command, the controller instructs the electric motors 6131 of the two position adjusting parts to drive the output shaft 6132 to rotate, so that the two mouse halves 200 move toward each other.

3. The user may couple the upper cover of the mouse to the mouse halves. After the upper cover of the mouse is coupled to the two halves and forms the top surface of the mouse, when the controller detects that a left or right button on the mouse is pressed or the mouse is moved, the controller sends a second instruction signal to a terminal, so that the terminal performs a corresponding operation according to the second instruction signal.

The button is a left button or a right button.

When the gamepad function of the mouse is not needed, the controller controls the mouse to close, then the user couples the upper cover to the mouse halves, and thus the mouse may continue to implement the cursor positioning function.

By way of example, the second instruction signal is a click signal. Referring to FIG. 6, the scroll wheel assembly 300 includes a first micro switch 301 and a second micro switch 302. The first micro switch 301 is located below the left button and is electrically connected to the controller. The second micro switch 302 is located below the right button and is electrically connected to the controller. When a button on the mouse is pressed once, a metal reed in a corresponding micro switch is triggered once, the controller generates a click signal and sends the click signal to a terminal, and at the same time the micro switch is reset. Thereafter, the terminal performs a corresponding click operation according to the click signal, for example, opening a webpage link or the like.

For example, the second instruction signal is used to instruct the moving direction and moving distance of the mouse. In order to perform a cursor positioning operation by the terminal, the mouse further includes a cursor positioning structure. For example, the cursor positioning structure may include a light-emitting diode, optical lens, and a light sensing device. The cursor positioning structure is connected to the controller. When the mouse is moved, the cursor positioning structure is used to collect the movement track information of the mouse. The controller is configured to determine the moving direction and the moving distance of the mouse according to the movement track information. The controller generates a second instruction signal instructing the moving direction and the moving distance of the mouse. Then, the controller sends the second instruction signal to a terminal, so that the terminal performs a cursor positioning operation according to the second instruction signal, thereby implementing a cursor positioning function.

It should be noted that the sequence of the steps in the method of controlling a mouse provided in the embodiments of the present disclosure may be adjusted appropriately, and the steps in the controlling method may be deleted or added according to the situation. Any variations of the method within the technical scope disclosed by the present application which are easily envisaged by a person of ordinary skill in the art shall fall within the protection scope of the present application, which is not repeated here.

In summary, in the method of controlling a mouse provided in the embodiments of the present application, the upper cover of the mouse is removed when a gamepad function of the mouse is needed. Upon receiving a second control command, the controller instructs the at least one position adjusting part to control the two mouse halves to move away from each other. When the gamepad function of the mouse is not needed, the controller instructs the at least one position adjusting part to control the two mouse halves to move toward each other upon receiving a first control command, and then coupling the upper cover of the mouse to the mouse halves. As such, the functions of the mouse are enriched. The gamepad structure on the mouse could be adjusted, and the size of the gamepad structure could become larger or smaller, thereby satisfying the using habits of different users and increasing the flexibility in use.

There is further provided a computer-readable storage medium in an embodiment of the present disclosure. The computer-readable storage medium stores therein instructions that, when executed by a controller, implement the control process of the mouse.

The mouse includes an upper cover and two mouse halves, wherein a scroll wheel assembly is located between the two mouse halves, each of the mouse halves has a keypad and a joystick, the keypads and the joysticks are located inside the mouse, the joysticks on the two mouse halves are movably connected to the scroll wheel assembly respectively, the mouse further comprises at least one position adjusting part, and each of the position adjusting parts is connected to the scroll wheel assembly and one of the mouse halves, a left button and a right button being located at a front end of the upper cover of the mouse. Exemplarily, the schematic diagram of the structure of the mouse may be made reference to any of FIG. 3 to FIG. 6 and FIG. 8.

The control process comprises: instructing the at least one position adjusting part to control the two mouse halves to move away from each other upon receiving a second control command, and sending a first instruction signal to a terminal when detecting that at least one of the keypad and the joystick is operate, so that the terminal performs a corresponding operation according to the first instruction signal; instructing the at least one position adjusting part to control the two mouse halves to move toward each other upon receiving a first control command; and sending a second instruction signal to the terminal when detecting that a button on the mouse is pressed or the mouse is moved, so that the terminal performs a corresponding operation according to the second instruction signal, the button being the left button or the right button.

Persons of ordinary skill in the art could understand that all or part of the steps implementing the above embodiments could be achieved through hardware, or through relevant hardware instructed by application(s). The application(s) may be stored in a computer readable storage medium, such as read-only memory, disk or CD, etc.

The foregoing descriptions are only exemplary embodiments of the present application, and are not intended to limit the scope of the present application. Any modifications, equivalent substitutions, improvements, etc. within the spirit and principles of the application are encompassed within the protection scope defined by the appended claims of the present application.

What is claimed is:

1. A mouse comprising an upper cover and two mouse halves, wherein a scroll wheel assembly is located between the two mouse halves, each of the mouse halves has a keypad and a joystick, the keypads and the joysticks are located inside the mouse, the joysticks on the two mouse halves are movably connected to the scroll wheel assembly respectively, the mouse further comprises at least one position adjusting part, each of the at least one position adjusting part connects to the scroll wheel assembly and one of the mouse halves;

wherein the at least one position adjusting part is configured for controlling the two mouse halves to move toward or away from each other; and the mouse further comprises two position adjusting parts, wherein the two position adjusting parts are in one-to-one correspondence with the two mouse halves, each of the position adjusting parts includes one slider, and each of the sliders is located at a front end of a corresponding mouse half; and each of the sliders has a compartment having a sliding shaft and a drive mechanism therein, the drive mechanism is movably connected to the sliding shaft and is connected to a corresponding mouse half, the sliding shaft is fixedly connected to the scroll wheel assembly, and the drive mechanism moves axially relative to the sliding shaft by the connection of the sliding shaft to drive the corresponding mouse half to move in a direction toward or away from the scroll wheel assembly.

2. The mouse of claim 1, wherein each of the sliders further has a rotating shaft connected to a corresponding keypad and a corresponding mouse half, and the keypad is capable of being turned over around the rotating shaft.

3. The mouse of claim 2, further comprising a controller, wherein each of the drive mechanisms includes an electric motor and an output shaft, the electric motor is electrically connected to the controller, and an outer surface of the output shaft is threadedly sleeved with the sliding shaft;

the controller is configured to control the electric motors of the two position adjusting parts to drive a corresponding output shaft to rotate upon receiving a first control command, the rotating output shaft moves axially by the connection of the corresponding sliding shaft to drive a corresponding mouse half to move in a direction toward the scroll wheel assembly, and the first control command is used to instruct the two mouse halves to move toward each other; and the controller is further configured to control the electric motors of the two position adjusting parts to drive a corresponding output shaft to rotate upon receiving a second control command, the rotating output shaft moves axially by the connection of the corresponding sliding shaft to drive a corresponding mouse half to move in a direction away from the scroll wheel assembly, and the second control command is used to instruct the two mouse halves to move away from each other.

4. The mouse of claim 3, wherein the scroll wheel assembly has an adjustment button electrically connected to the controller, and when the adjustment button is pressed, a control command is sent to the controller, wherein the control command is the first control command or the second control command.

5. The mouse of claim 1, wherein the scroll wheel assembly comprises a scroll wheel and a support, the scroll wheel being located on the support, the joysticks on the two mouse halves are hinged to the support respectively, and the sliding shaft is movably connected to the support.

6. The mouse of claim 2, wherein the rotating shaft is fixedly connected to a corresponding keypad and is further movably connected to a corresponding mouse half, and each of the sliders further has a limiting plate for limiting the degree of horizontal displacement of the rotating shaft.

7. The mouse of claim 1, wherein one side of the scroll wheel assembly connected to the sliding shaft has a slot, the length direction of the slot is perpendicular to the height direction of the mouse, one end of the sliding shaft is clamped in the slot.

8. The mouse of claim 3, wherein each of the drive mechanisms further comprises a speed limiter electrically connected to the electric motor.

9. A method of controlling a mouse, wherein the mouse comprises an upper cover and two mouse halves, a scroll wheel assembly is located between the two mouse halves, each of the mouse halves has a keypad and a joystick, the keypads and the joysticks are located inside the mouse, the joysticks on the two mouse halves are movably connected to the scroll wheel assembly respectively, and the mouse further comprises at least one position adjusting part, each of the at least one position adjusting part connects to the scroll wheel assembly and one of the mouse halves;

the mouse further comprises a controller, a left button and a right button being located at a front end of the upper cover of the mouse; the mouse further comprises two position adjusting parts, wherein the two position adjusting parts are in one-to-one correspondence with the two mouse halves, each of the position adjusting parts includes one slider, and each of the sliders is located at a front end of a corresponding mouse half; and each of the sliders has a compartment having a sliding shaft and a drive mechanism therein, the drive mechanism is movably connected to the sliding shaft and is connected to a corresponding mouse half, the sliding shaft is fixedly connected to the scroll wheel assembly, and the drive mechanism moves axially relative to the sliding shaft by the connection of the sliding shaft to drive the corresponding mouse half to move in a direction toward or away from the scroll wheel assembly; and the method comprises:

after the upper cover of the mouse is removed, when the controller receives a second control command, instructing, by the controller, the at least one position adjusting part to control the two mouse halves to move away from each other; and when the controller detects that at least one of the keypad and the joystick is operated, sending, by the controller, a first instruction signal to a terminal so that the terminal performs a corresponding operation according to the first instruction signal;

when the gamepad function of the mouse is not needed and when the controller receives a first control command, instructing, by the controller, the at least one position adjusting part to control the two mouse halves to move toward each other; and after the upper cover of the mouse is coupled to the two halves and forms the top surface of the mouse, when the controller detects that a button on the mouse is pressed or the mouse is moved, sending, by the controller, a second instruction signal to the terminal so that the terminal performs a corresponding operation according to the second instruction signal, the button being the left button or the right button.

10. The method of claim 9, wherein the first instruction signal is a direction instruction signal, and said when the controller detects that at least one of the keypad and the joystick is operated, sending, by the controller, a first instruction signal to a terminal comprises:

when the controller detects that the joystick is operated, generating, by the controller, the direction instruction signal, and sending the direction instruction signal to the terminal, so that the terminal controls the movement of a target object according to the direction instruction signal.

11. The method of claim 9, wherein the first instruction signal is a keypad signal, and said when the controller detects that at least one of the keypad and the joystick is operated, sending, by the controller, a first instruction signal to a terminal comprises:

when the controller detects that the keypad is operated, generating, by the controller, the keypad signal, and sending the keypad signal to the terminal, so that the terminal performs a corresponding operation according to the keypad signal.

12. The method of claim 9, said instructing, by the controller, the at least one position adjusting part to control the two mouse halves to move away from each other comprises:

instructing, by the controller, each of the drive mechanisms to move axially relative to the sliding shaft by the connection of a corresponding sliding shaft in a direction away from the scroll wheel assembly to drive a corresponding mouse half to move in a direction away from the scroll wheel assembly; and said instructing, by the controller, the at least one position adjusting part to control the two mouse halves to move toward each other comprises:

instructing, by the controller, each of the drive mechanisms to move axially relative to the sliding shaft by the connection of a corresponding sliding shaft in a direction toward the scroll wheel assembly to drive a corresponding mouse half to move in a direction towards the scroll wheel assembly.

13. The method of claim 12, wherein each of the drive mechanisms includes an electric motor and an output shaft, the electric motor is electrically connected to the controller, and an outer surface of the output shaft is threadedly sleeved with the sliding shaft;

said instructing, by the controller, each of the drive mechanisms to move axially relative to the sliding shaft by the connection of a corresponding sliding shaft comprises:

controlling, by the controller, the electric motors of the two position adjusting parts to drive a corresponding output shaft to rotate, and the rotating output shaft moves axially by the connection of the corresponding sliding shaft.

14. The method of claim 9, wherein the scroll wheel assembly has an adjustment button electrically connected to the controller, after the upper cover of the mouse is removed, the method further comprises:

after the adjustment button is pressed, receiving, by the controller, the control command sent by the adjustment button, wherein the control command is the first control command or the second control command.

15. The method of claim 14, wherein the controller determines the type of the control command according to the duration that the adjustment button is pressed.

16. The method of claim 14, wherein the controller determines the type of the control command according to the frequency at which the adjustment button is pressed within a specified duration.

17. The method of claim 14, wherein the controller determines the type of the control command according to the pressure under which the adjustment button is pressed.

18. A computer-readable storage medium, comprising instructions stored therein that, when executed by a processor, implement the control process of a mouse, the mouse comprises an upper cover and two mouse halves, wherein a scroll wheel assembly is located between the two mouse halves, each of the mouse halves has a keypad and a joystick, the keypads and the joysticks are located inside the mouse, the joysticks on the two mouse halves are movably connected to the scroll wheel assembly respectively, the mouse further comprises at least one position adjusting part each connected to the scroll wheel assembly and one of the mouse halves, a left button and a right button being located at a front end of the upper cover of the mouse; the mouse further comprises two position adjusting parts, wherein the two position adjusting parts are in one-to-one correspondence with the two mouse halves, each of the position adjusting parts includes one slider, and each of the sliders is located at a front end of a corresponding mouse half; and each of the sliders has a compartment having a sliding shaft and a drive mechanism therein, the drive mechanism is movably connected to the sliding shaft and is connected to a corresponding mouse half, the sliding shaft is fixedly connected to the scroll wheel assembly, and the drive mechanism moves axially relative to the sliding shaft by the connection of the sliding shaft to drive the corresponding mouse half to move in a direction toward or away from the scroll wheel assembly the control process comprises:

instructing the at least one position adjusting part to control the two mouse halves to move away from each other upon receiving a second control command, and sending a first instruction signal to a terminal when detecting that at least one of the keypad and the joystick is operated, so that the terminal performs a corresponding operation according to the first instruction signal;

instructing the at least one position adjusting part to control the two mouse halves to move toward each other upon receiving a first control command; and sending a second instruction signal to the terminal when detecting that a button on the mouse is pressed or the mouse is moved, so that the terminal performs a corresponding operation according to the second instruction signal, the button being the left button or the right button.

\* \* \* \* \*